(12) United States Patent
Munir

(10) Patent No.: US 10,657,746 B1
(45) Date of Patent: May 19, 2020

(54) ACCESS CONTROL SYSTEM INCLUDING OCCUPANCY ESTIMATION

(71) Applicant: Robert Bosch GmbH, Stuttgart (DE)

(72) Inventor: Sirajum Munir, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/251,707

(22) Filed: Jan. 18, 2019

(51) Int. Cl.
*B60R 25/00* (2013.01)
*G07C 9/02* (2006.01)
*G06K 9/00* (2006.01)

(52) U.S. Cl.
CPC .......... *G07C 9/02* (2013.01); *G06K 9/00369* (2013.01); *G06K 9/00778* (2013.01)

(58) Field of Classification Search
None
See application file for complete search history.

(56) References Cited

U.S. PATENT DOCUMENTS

| 10,282,927 | B1 * | 5/2019 | Hutz | G07C 9/00309 |
| 2011/0176000 | A1 | 7/2011 | Budge et al. | |
| 2013/0243240 | A1 | 9/2013 | Marks et al. | |
| 2014/0139633 | A1 * | 5/2014 | Wang | G06K 9/00201 |
| | | | | 348/46 |
| 2015/0049906 | A1 | 2/2015 | Fu et al. | |
| 2015/0294482 | A1 * | 10/2015 | Stephen | G06K 9/00771 |
| | | | | 382/103 |
| 2016/0358074 | A1 * | 12/2016 | Latapie | G06N 3/088 |

OTHER PUBLICATIONS

Munir et al., Real-Time Fine Grained Occupancy Estimation using Depth Sensors on Arm Embedded Platforms, 2017 IEEE Real-Time and Embedded Technology and Applications Symposium (RTAS), pp. 295-306, Pittsburgh, PA, 12 pages.
Oosterhout et al., Head Detection in Stereo Data for People Counting and Segmentation, VISAPP 2011, Mar. 5, 2011, pp. 620-625, XP055065199, Netherlands, 6 pages.

* cited by examiner

*Primary Examiner* — Adolf Dsouza
(74) *Attorney, Agent, or Firm* — Brooks Kushman P.C.

(57) ABSTRACT

An access control system includes an entrance threshold, a privilege access management module, a depth sensor, and an occupancy estimation module. The privilege access management module may be configured to, responsive to an authorization input from a reader, output an access grant to traverse the threshold and generate an approved number of individuals allowed admittance across the threshold during a predetermined period of time. The depth sensor may be located above the threshold and configured to generate and output 3-dimensional depth data. The occupancy estimation module may be in communication with the privilege access management module and configured to output a count of individuals crossing the threshold during the predetermined period of time, that is based on a hemi-ellipsoid model of the depth data. The access control system may, responsive to a difference between the approved number allowed admittance and count of individuals crossing the threshold, inhibit the access grant.

17 Claims, 4 Drawing Sheets

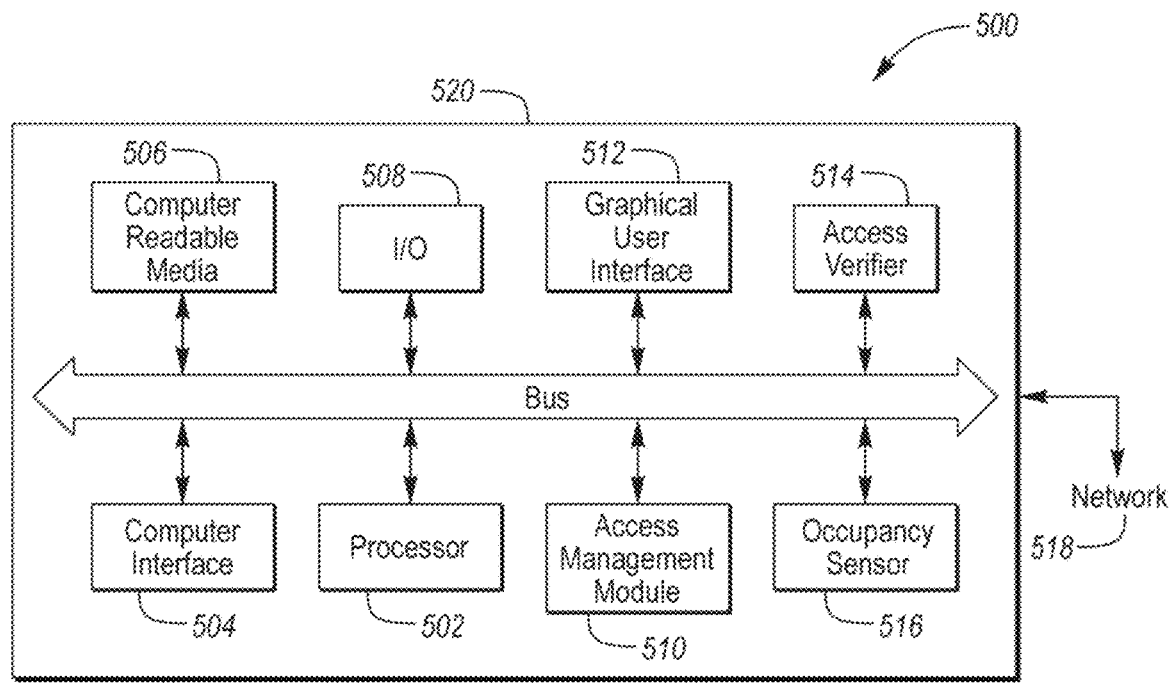
FIG. 5
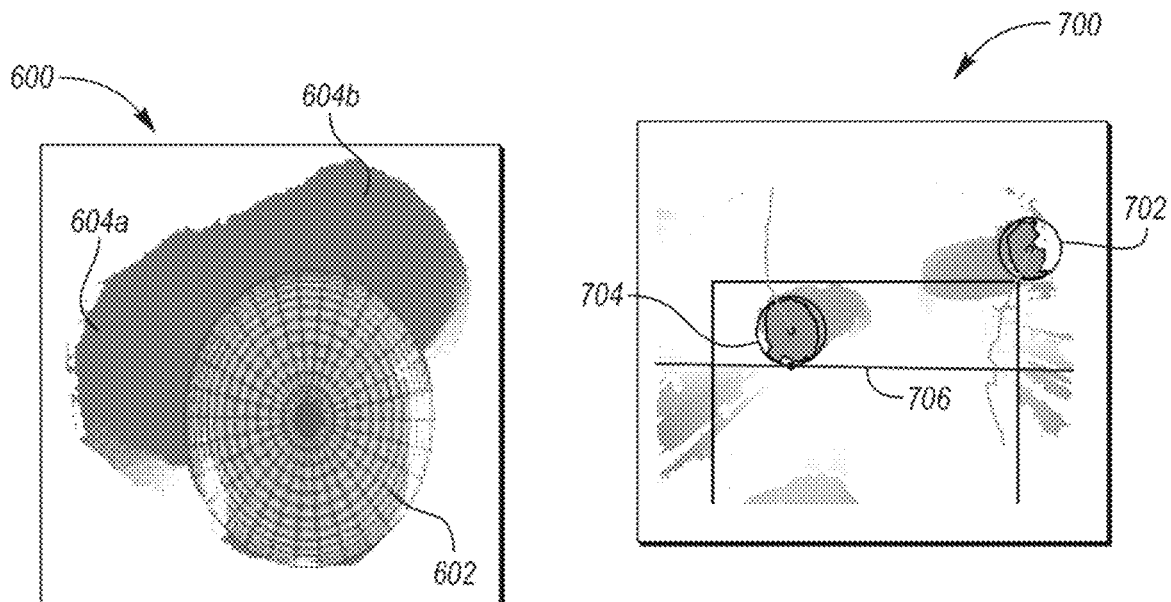
FIG. 6
FIG. 7

ACCESS CONTROL SYSTEM INCLUDING OCCUPANCY ESTIMATION

TECHNICAL FIELD

This invention relates to a system and method for access control correlating occupancy estimation with privilege authorization.

BACKGROUND

Access control refers to the physical security enforced in an area to ensure only the authorized people could access that area. It is very important in a lot of settings, e.g., commercial offices, manufacturing facilities, construction sites, bus stops, train stations, airports, academic buildings, hospitals, stadiums, theaters, and convention centers.

There are several techniques for enforcing access control. In some places, access control is enforced by keeping personnel, e.g., a guard or a bouncer. In some places, mechanical locks and keys are used (only people who have the keys can open the lock). In other places, electronic solutions are used, e.g., using a reader and a badge (swiping the badge into the reader opens the door, if the badge has adequate privilege), passcode based controller (entering the correct passcode into the controller opens the door).

SUMMARY

An access control system includes an entrance threshold, a privilege access management module, a depth sensor, and an occupancy estimation module. The privilege access management module may be configured to, responsive to an authorization input from a reader, output an access grant to traverse the threshold and generate an approved number of individuals allowed admittance across the threshold during a predetermined period of time. The depth sensor may be located above the threshold and configured to generate and output 3-dimensional depth data. The occupancy estimation module may be in communication with the privilege access management module and configured to output a count of individuals crossing the threshold during the predetermined period of time, that is based on a hemi-ellipsoid model of the depth data. The access control system may, responsive to a difference between the approved number allowed admittance and count of individuals crossing the threshold, inhibit the access grant.

An access management method includes receiving, from a privilege access management module, an access grant through an entrance; generating an approved number of individuals allowed to pass through the entrance based on the access grant during a predetermined period of time then parsing data from a depth profiler located above the entrance, the data being indicative of objects below the depth profiler. Then the method includes generating a count of individuals identified from the data via a hemi-ellipsoidal model crossing the entrance during the predetermined period of time, and responsive to a difference between the number and count, inhibiting admittance through the entrance.

A non-transitory computer-readable medium tangibly embodying computer readable instructions for a software program, the software program being executable by a processor of a computing device to provide operations including receiving, from a privilege access management module, an access grant through an entrance; generating an approved number of individuals allowed to pass through the entrance based on the access grant, and parsing data from a depth profiler located above the entrance, the data being indicative of objects below the depth profiler. The operations further include generating a count of based on individuals identified from the data via a hemi-ellipsoidal model, and responsive to a difference between the number and count, inhibiting admittance through the entrance.

BRIEF DESCRIPTION OF THE DRAWINGS

FIG. 5 illustrates a block diagram of an access control system.

FIG. 6 is an illustration of a hemi-ellipsoid model based on data captured via an occupancy estimation system.

FIG. 7 is an illustration of tracking a person entering and another person exiting a location based on an image captured via an occupancy estimation system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

As previously stated, there are several techniques for enforcing access control, enforcement by personnel, e.g., a guard or a bouncer, the use of mechanical locks and keys, and electronic solutions, e.g., using a badge reader and a badge (swiping the badge into the reader opens the door, if the badge has adequate privilege), and passcode based controller (entering the correct passcode into the controller opens the door).

In all of the previous mentioned access control techniques, an individual with the correct privilege level could abuse the system by allowing others enter. For example, using a reader and a badge, a first individual A could open a door to a location as he has adequate access privilege in an access badge and let two additional individuals, B and C, to go inside even though B and C may not have sufficient access right.

Figure 2:
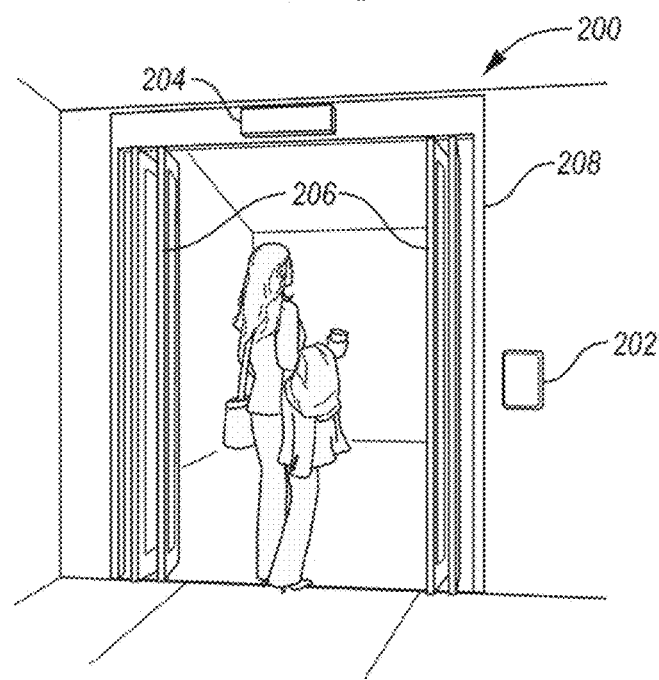
FIG. 2 is an illustration of an entryway access control system including occupancy estimation and privilege access management.

Here an access control system that combines an occupancy counting system to verify access privilege control. In one embodiment, a depth sensor is located above a doorway as shown in FIG. 2. The depth sensor is used to accurately count the number of people going inside and outside of a location as shown in FIG. 7. The depth sensor may be a simple proximity sensor that uses infra-red (IR) light, or ambient light. For example, the sensor may have a light source that emits light rays in a direction and a sensor array detects light reflected off of objects from the light source. The light may of a specific frequency (e.g., 850 nm) and may be coherent allowing the measurement of a time of flight. The sensor may be include a single array (mono camera) or two arrays (stereo cameras). The depth sensor may that be activated (e.g., triggered or turned on) by a proximity sensor, motion detector, ultrasonic sensor, Red-Green-Blue (RGB) camera or other motion detection means.

When the sensor detects that two or more people are entering (using the people counting solution) after a single swipe of badge, or after obtaining a single pass of entrance, the system may (i) output an alarm (e.g., a signal to a control station, a message to a guardian of the badge, a red stop light, or warning light), (ii) emit an audible warning (e.g., a bell, or chime), (iii) inhibit access to the location (e.g., lock the door to the location, or disable the badge's future privileges), or (iii) incriminate the person whose badge was swiped at that time.

The access management system may then record the information associated with discrepancy that may be made available to facility managers of the location. The facility managers may revoke the privilege of the person who was involved in allowing unauthorized access.

Figure 1:
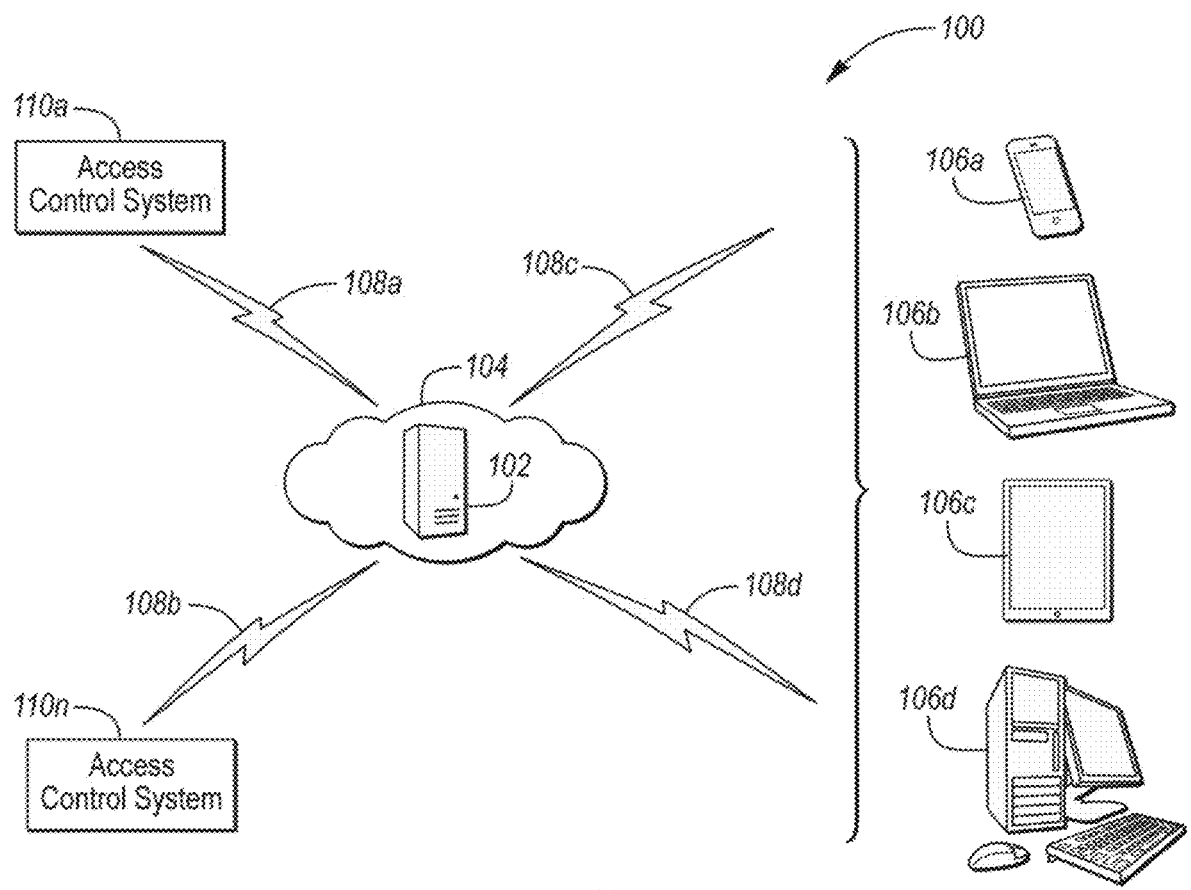
FIG. 1 is an illustration of a block diagram of an access control system.

FIG. 1 is an illustration of a block diagram of an access control system 100. The access control system 100 includes an occupancy estimation system, an access verification system, and an access management module communicatively coupled to a server 102 via a communication link 108 over a network 104. The server 102 may be an application server, a certificate server, a mobile information server, an e-commerce server, a FTP server, a directory server, CMS server, a printer server, a management server, a mail server, a public/private access server, a real-time communication server, a database server, a proxy server, a streaming media server, or the like. The network 104 can comprise one or more sub-networks and the server 102 within the access control system 100. The network 104 can be for example a local-area network (LAN), a metropolitan area network (MAN), a wide area network (WAN), a primary public network with a private sub-network, a primary private network with a public sub-network, or a primary private network with a private sub-network. In other embodiments the network 104 can be any network type(s) such as a point to point network, a broadcast network, a telecommunication network, a data communication network, a computer network, an ATM (Asynchronous Transfer Mode) network, a SONET (Synchronous Optical Network) network, a SDH (Synchronous Digital Hierarchy) network, a wireless network, a wireline network, and the like. Depending on the application, other networks may be used so that data exchanged between the client machine and the server can be transmitted over the network. Network topology of the network 104 can differ within different embodiments which may include a bus network topology, a star network topology, a ring network topology, a repeater-based network topology, or a tiered-star network topology. In additional embodiments, the network 104 may include a network of mobile telephone networks that use a protocol to communicate among mobile devices, where the protocol can be for example AMPS, TDMA, CDMA, GSM, GPRS, UMTS, LTE or any other protocol able to transmit data among mobile devices. Although only one access control system 100 is illustrated, in other embodiments more than one access control system 100 may be installed and operating the same site and at the same entryway. If there are more than one site, at least one access control system 100 may be installed in each site. A plurality of access control system 100 may be installed and connected to one or multiple sub-networks, defined as a primary network, located between the access control systems and the server 102. The site may be a room, a place, a space regardless open or closed, any commonplaces, any private access places or locations, and the like. The access control system 100 is configured to fuse people count information with number of allowed access grants in the site in real-time as described in further detail below.

The communication link 108 may be wired (108a, 108b), wireless 108c, or combination thereof 108d. The network system 104 may be used in commonplace in offices, enterprise-wide computer networks, intranets, internets, public computer networks, or combination thereof. The wireless communication link may include cellular protocol, data packet protocol, radio frequency protocol, satellite band, infrared channel, or any other protocol able to transmit data among client machines. The wired communication link may include any wired line link. At least one machine 106 is communicatively coupled to the access control system 100 via the least one of the network 104 and the server 102. The machine 106 may be a cellular or smart phone 106a, a laptop 106b, a tablet 106c, a personal computer or desktop computer 106d, a personal digital assistant (PDA), a wearable device, a gaming console, an audio device, a video device, an entertainment device such as a television, a vehicle infotainment, or the like.

FIG. 2 is an illustration of an entryway access control system 200 including occupancy estimation module 204 and privilege access management module 202. The access control system generally includes a barrier 206 that is located in an entryway 208 to separate the restricted location from an unrestricted location. In this exemplary embodiment, a depth sensing based occupancy estimation and tracking system 204 is mounted above the threshold of the entryway 208. The occupancy estimation module 204 may be similar to the models proposed and developed by researchers S. Munir et al., ("Real-Time Fine Grained Occupancy Estimation Using Depth Sensors on ARM Embedded Platforms," 2017 IEEE Real-Time and Embedded Technology and Applications Symposium (RTAS), Pittsburgh, Pa., 2017, pp. 295-306) incorporated herein by reference.

The restricted location may be an office, a room, a restroom, a convention center, an airport, a train station, a train, a bus, an autonomous vehicle, an auditorium, a theatre, any private access places or locations, and the like. Also, in this embodiment, an access verifier 202 may be mounted at one side of the door. The access verifier 202 may also referred to as a privilege access system and includes an access badge reader, magnetic card reader, a ticket reader, a keypad, fingerprint reader, a near-field communication reader, a Bluetooth reader, microphone, or other admission system. The privilege access management module 202 may receive an authorization request such as swiping a badge via a badge reader, pressing a finger onto a fingerprint reader, inserting a ticket into a ticket reader, or displaying a barcode or QR code to an optical scanner. Upon reception of the authorization input request, the privilege access management module 202 may search a database to validate authorization and output an access grant, an approved number of individuals allowed to enter the location, and a period of time the access grant remains valid.

For example, the access control system 200 may verify the privilege of an individual based on a badge being held near the access badge reader 202 that communicates with a badge and upon verification of access privilege, the system may output a signal to open the doors 206 and output of number of allowed individuals, if the badge has sufficient privilege. The system 200 may then trigger the occupancy estimation and tracking system 204 to count a number of people entering the location such that the access management system 200 can compare the count from the occupancy estimation system 204 with the number of people having access via the access verification system 202. If there is a discrepancy in that the count and number are not equal, the access control system 200 may close the door 206, output an alarm, deactivate the credentials, and reduce privilege of the credentials. Once the door is open, the occupancy estimation and tracking system 204 monitors the number of people entering and reports that to access management module 200. The access management module compares the number of swiped badges with the number of people entered within a time window and if the latter is larger, it outputs an alarm (which could be a part of the system 200) and may record that information into a storage device. Access management module 200 could be incorporated into unit 204 or 202 or may be located in a remote server. Also, all of these modules may be consolidated into a single unit. The access control system 200 is communicatively coupled to one or more of the server, network, client machine, and access control system either a wireless or wired communication interface.

Other embodiments include an access control system for access to a transit system such as a train, bus, or other vehicle including an autonomous vehicle. For example, the access verifier 202 may be linked to an application of a cellular phone, computer, tablet, etc. and the occupancy estimation 204 may be located above the vehicle entrance (e.g., above the door, or located in a headliner facing the door entrance).

Figure 3:
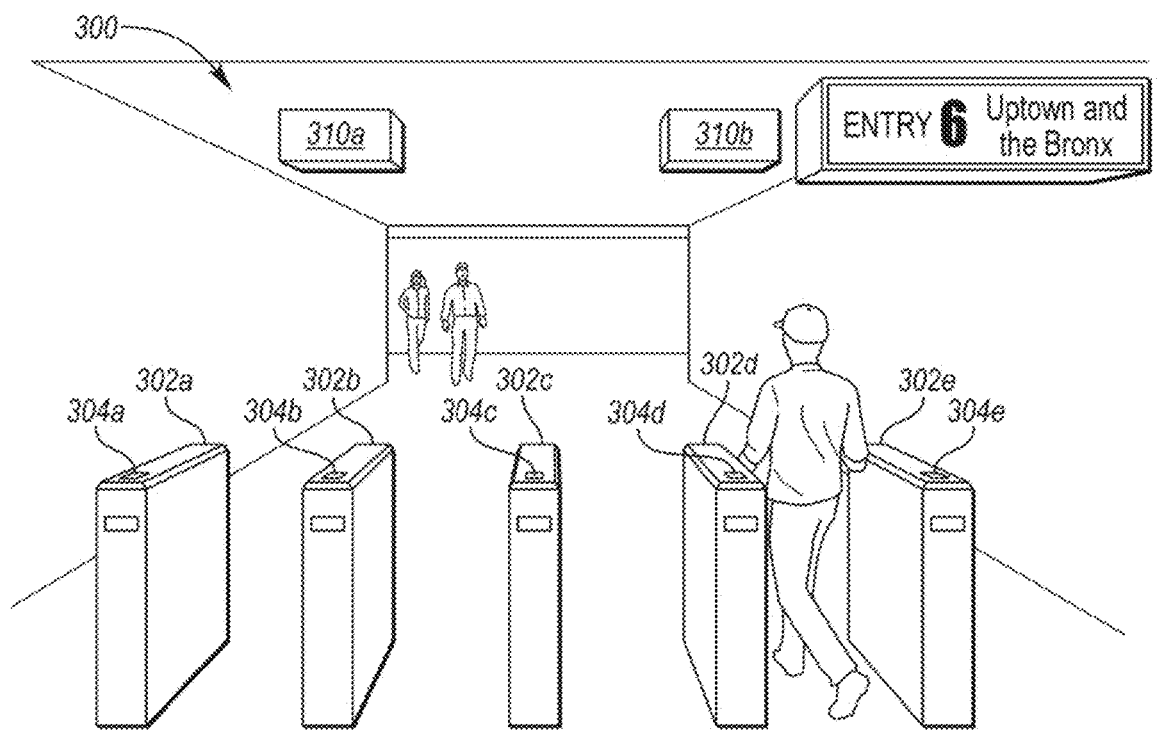
FIG. 3 is an illustration of a turnstile access control system including occupancy estimation and privilege access management.

FIG. 3 is an illustration of a turnstile access control system 300 including occupancy estimation 310 and privilege access management via the use of readers 304 and turnstile cabinets 302.

Here, a first lane is defined as an area configured to permit a flow of individuals between a first turnstile cabinet 302a having a first reader 304a and a second turnstile cabinet 302b having a second reader 304b. Likewise, a second lane is defined as an second area configured to permit a flow of individuals between the second turnstile cabinet 302b having the second reader 304b and a third turnstile cabinet 302c having a third reader 304c. A first occupancy detection module 310a is shown located above the first and second lanes. However, in other embodiments, the occupancy detection module 310a may be used to monitor and generate a profile map for more than 2 lanes, for example, the occupancy detection module 310a may be located above the second lane and provide detection of the first, second, and third lanes, the third lane being defined as a third area configured to permit a flow of individuals between the third turnstile cabinet 302c having the third reader 304c and a fourth turnstile cabinet 302d having a fourth reader 304d. Lastly, a fourth lane may be defined as a fourth area configured to permit a flow of individuals between the fourth turnstile cabinet 302d having the fourth reader 304d and a fifth turnstile cabinet 302e having a fifth reader 304e. Here a second occupancy detection module 310b is shown located above the third and fourth lanes.

In this illustration the turnstile cabinets 302 provide lanes of traffic without use of a physical barrier, however in other embodiments, a physical barrier may be used. For example, the turnstile cabinets 302 may include a waist high rotating tripod barrier, a flap barrier, a swing barrier, or a revolving door.

Figure 4:
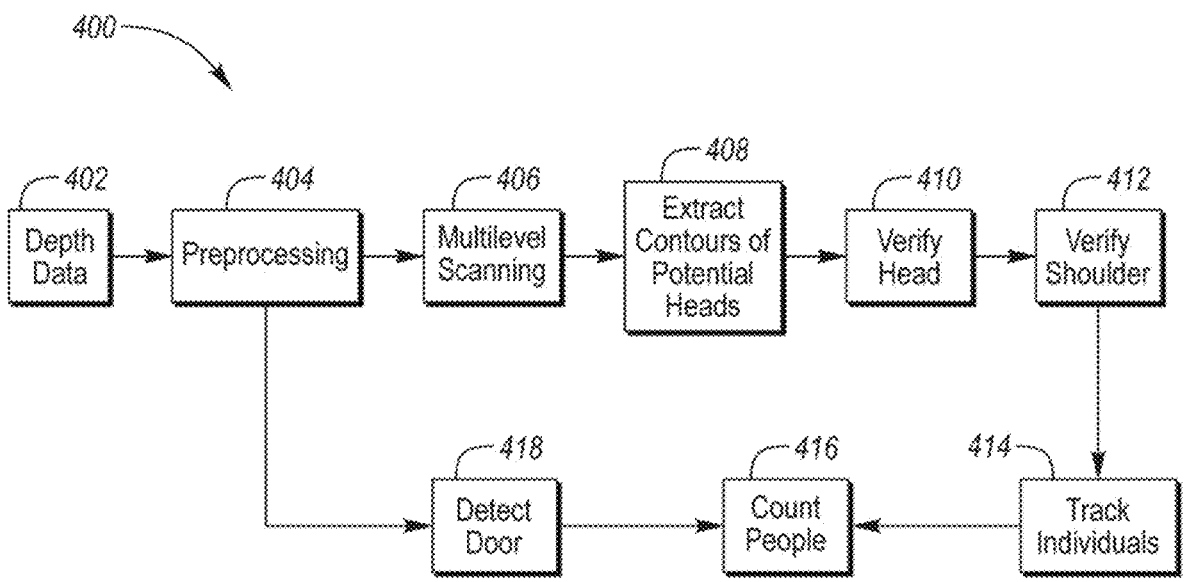
FIG. 4 is a flow diagram of occupancy estimation of an access control system.

FIG. 4 is a flow diagram of an access control system 516 to monitor a flow of people through an entryway and occupancy of a respective site. In the description of the methods, statements that a method is performing some task or function refers to a controller or general purpose processor (e.g., the processor 502) executing programmed instructions (e.g. the occupancy sensing program) stored in non-transitory computer readable storage media (e.g., the memory 506) operatively connected to the controller or processor to manipulate data or to operate one or more components in the occupancy sensing device 516 to perform the task or function. Additionally, the steps of the methods may be performed in any feasible chronological order, regardless of the order shown in the figures or the order in which the steps are described.

In a step 410, the processor 502 receives depth sensor data from the depth sensor 516. As discussed above, the data provided by depth sensor 516 may be in the form of image frames. In particular, the processor 502 is configured to receive a chronological sequence of image frames, each including depth sensor data detected by the depth sensor 516 at a respective time. Each pixel of each depth image frame provides the distance from the depth sensor 516 to the nearest object. In one embodiment, the depth sensor 516 is configured to output image frames having a defined resolution (e.g., 512×424) and frame rate (e.g., 30 frames per second).

In a step 404, the processor 502 is configured to pre-process the received depth sensor data. Particularly, in some embodiments, in the presence of noise, a corresponding pixel of a depth image frame may have a value of 0 or some other outlier value. Accordingly, in one embodiment, the processor 502 is configured to reset noise pixels and outliers (depth exceeding a predetermined threshold) to a depth of the floor. In one embodiment, the processor 502 is configured to compute the depth of the floor by calculating a histogram of the depth values of a frame, where the bin with the maximum number of depth data points is considered the floor. Additionally, in some embodiments, the processor 502 is configured to apply median filtering to smooth each depth image frame. FIG. 7 shows an exemplary pre-processed depth image frame 700 have a person 702 entering through the entryway and a person 704 exiting through the doorway.

With reference to FIG. 5, in steps 406 and 408, the processor 502 is configured to perform multilevel scanning, in which multiple potential depth levels are scanned to detect humans and, for each scanned depth level, extract contours of potential human heads by ignoring the depth data below that level. Particularly, the goal of this step is to determine the centers and radii of minimum enclosing circles of all the potential heads. To this end, the processor 502 is configured to perform multilevel scanning, and determine the centers and radii of the heads by detecting contours at different height levels. In one embodiment, the processor 502 is configured to start scanning the depth sensor data from a first height (e.g., 6 feet from the floor) to a second height (e.g., 2 feet from the floor) at a predetermined interval (e.g., every 6 inches). It is noted that the average height of an adult male is about 5'7" to 5'11" and a female is about 5'2" to 5'7" and the starting height and ending height are chosen conservatively so that humans are not missed during multilevel scanning. When the processor 502 scans depth data at each height level, the processor 502 is configured to discard all the depth data below that height level. The processor 502 is configured to find all the contours at each depth level. For each contour, the processor 502 is configured to find a minimum enclosing circle (such as circles 702 and 704, shown in FIG. 7) using an iterative algorithm. The center and radius of the minimum enclosing circle is considered the center and radius of the head. As discussed below, for each detected center and radius, the processor 502 is configured to verify whether it is a person by verifying the presence of a head and a shoulder. However, a single person can be detected at different levels. In order to avoid this, the processor 502 is configured to scan from the top and when it verifies a person at a higher depth level, it discard all the nearby centers at lower levels.

In some embodiments, the processor 502 leverages two strategies to speed up processing. Firstly, when performing multilevel scanning, the processor 502 is configured to it is performed out of order. Instead of scanning from top (e.g., 6 feet from the floor) to bottom (2 feet from the floor) in a serial order, the processor 502 is configured to scan at the top most level first and then at the most bottom level, and then scan at the remaining levels. The intuition is that if there is someone there, the depth sensor 516 should capture a body at the bottom level scanning. If the bottom level scanning returns that there is nothing there compared to the approximate background (described below), the processor 502 is configured to move on to process the next depth image frame. Otherwise, the processor 502 is configured to scan the remaining levels in a serial order (top to bottom) to determine the precise location of the head. Secondly, the processor 502 is configured to not scan at the levels that do not have enough depth data compared to an approximate background. The processor 502 is configured to determine the approximate background by building a histogram of depth data points at different scanning levels (e.g., 6-inch bin sizes). Each time the processor 502 sees a new frame, the processor 502 is configured to update the histogram by assuming that the minimum number of depth data points seen so far at a level is from the background, which reasonably captures the wall, door, tables etc. in the environment. This approximate background detection technique enables the processor 502 to move on to the next frame quickly when there is no one in the scene.

In steps 410 and 412, the processor 502 is configured to verify whether each extracted contour represents a real person by verifying the presence of a head and a shoulder using anthropometric properties of a human body. Particularly, in the step 410, given a center $(c_x, c_y)$ and a radius r of a head, the goal of this step is to verify if there is a human head at this position. The processor 502 is configured to use a hemi-ellipsoid (top half of an ellipsoid) to model a human head. Particularly, an ellipsoid in Cartesian coordinates is represented by the equation $$\frac{(x-c_x)^2}{a^2} + \frac{(x-c_y)^2}{b^2} + \frac{(x-c_z)^2}{c^2} = 1 \quad (1)$$

In which a, b, and c are the lengths of the semi-axes and $(c_x, c_y, c_z)$ is the center of the ellipsoid. The processor 502 is configured to set a=b=r (in pixel co-ordinate), and we set c=0.5*D (in depth co-ordinate), where D is the depth of a human head (e.g., 220 mm). The processor 502 is configured to $c_2$=T+0.5*D, where T is smallest distance between the depth sensor 516 and the head. The processor 502 is configured to iterate over the x, y values of the detected contours, compute a z value for each (x, y), and compare it with the corresponding z value in the depth frame. If the average difference is less than a threshold $T_{head}$, the processor 502 is configured to report that a head is detected.

In the step 412, given a center $(c_x, c_y)$ and a radius r of a head, the goal of this step is to verify if there is a human shoulder close to this position. In order to verify a shoulder, the processor 502 is configured to perform four steps. First, the processor 502 is configured to consider a region of interest (ROI) surrounding the head and the shoulder. The end-to-end distance between the two shoulders of a person is around three times his head's diameter and hence the processor 502 is configured to choose a slightly bigger square ROI around the head. Second, the processor 502 is configured to extract the head from it by discarding all the depth data higher than T+D (computed in the head verification step). Third, the processor 502 is configured to subtract the head from the region of interest to obtain the shoulder depth data. Note that from the first step, the processor 502 is configured to discard all the depth data higher than T+D+S by setting these values to 0, where S is the depth of the shoulder. In one embodiment, the processor 502 is configured to set S to 250 mm, as ~10 inch depth is reasonable enough to capture a shoulder. Fourth, the processor 502 is configured to determine whether the obtained depth data conforms to a shoulder by trying several techniques. For example, in one embodiment, the processor 502 is configured to detect contours and measure a goodness of fit to an ellipse. In another embodiment, the processor 502 is configured to compute a histogram of depth data at different height levels and check if there is at least one bin at the shoulder depth level around the head's position that has enough depth data points to represent a shoulder. If there is no shoulder, e.g., for a ball, the depth data at that position will be close to the floor level and the bin at the shoulder level will not have enough depth data points. The purpose of the shoulder verification is to avoid spherical objects, e.g., balls, balloons, and spherical lamps. For counting people, the head verification usually suffices. However, shoulder size is a useful feature for identifying and tracking occupants.

In a step 418, the processor 502 is configured to determine the location of the door. Particularly, in one embodiment, the processor 502 is configured to determine the location of the door automatically, in six steps. First, starting with the preprocessed image, the processor 502 is configured to perform median filtering with kernel size 5. Second, the processor 502 is configured to discard the depth data that are very close to the ground (within 1 foot) and 2 feet above it by replacing these with the maximum floor depth. Third, the processor 502 is configured to detect Canny edges to increase contrast and reduce noise. Fourth, the processor 502 is configured to perform Hough line transformation on the Canny edges to detect straight lines. Even though Canny edge detection and Hough line transformations are not computationally cheap, it doesn't degrade the real-time performance as door detection is performed only at the beginning. Fifth, from the candidate Hough lines, the processor 502 is configured to choose the line (e.g., the line Door 706, as shown in FIG. 7) having the highest accumulator vote that is most parallel to the X axis of the depth frame.

In a step 414, the processor 502 is configured to track an individual people entering and exiting the entryway. The processor 502 performs two types of tracking: (i) basic tracking to determine whether people went inside or outside through a door to count them accurately and (ii) biometric tracking to identify and track individuals. The processor 502 is configured to implement a lightweight greedy bipartite matching algorithm by leveraging the position, height, and head radius of people. Assume that the processor 502 detects N and M people in the previous and current frames, respectively. For each pair of people (i,j), where $i \in \{1, 2, 3, \ldots N\}$ and $j \in \{1, 2, 3, \ldots M\}$, the processor 502 is configured to normalize the distance between head centers, the difference of head radii and heights of each pair. Then the processor 502 is configured to compute a weighted distance by using these three distances (e.g., weight: 1, 1, and 0.5, respectively). The reason for a smaller weight for height difference is that we observe that the height of a person varies up to 40 millimeters when he or she walks from one side to the other. Then, the processor 502 is configured to sort the distances in ascending order and pair them in that order. If someone $j \in \{1, 2, 3, \ldots M\}$ is not paired, the processor 502 is configured to add him in the current frame. However, if someone $i \in \{1, 2, 3, \ldots N\}$ is not paired, the processor 502 is configured to do not immediately discard him, because, it is possible that the depth sensor 516 may miss someone in a frame and detect him in the next frame. For the missing person, the processor 502 is configured to predict the person's current position based on his average walking speed and direction, and update the location of the center of his head accordingly. To do so, every time there is a pair, the processor 502 is configured to update average walking speed and direction of the person. As an example, FIG. 7 shows tracking of two people: person 702 entering through the doorway and person 704 exiting through the doorway. The system increments occupancy count when person 702 crosses door line 706 and the system decrements occupancy count when person 704 crosses door line 706.

At low frame rates, someone can move a considerable distance between consecutive frames, which impacts tracking negatively, e.g., when someone (P1) leaves through a door and someone else (P2) enters from the other side of the door in the next frame. It may look like P1 has moved towards his opposite direction and may increase/decrease the occupancy count erroneously. As the head of P1 is missing at the current frame, the greedy bipartite matching tries to match the earlier frame's P1 with the current frame's P2. To avoid this, the processor 502 is configured to consider the walking direction and if the matching requires a reversal of direction, the processor 502 is configured to check if there is a presence of a depth shadow of P1 in the current and previous frames at his respective predicted positions. As used herein depth shadow means a head is missing, but a partial body contour is seen near to that location. If a depth shadow is present, the processor 502 is configured to assume that P1 is/was there while P2 enters and we do not allow the matching.

Every time someone enters/exits through the entryway, the processor 502 is configured to extract a plurality of simple features regarding height, head radius, shoulder size, going in/coming out, and walking speed of the subject. More specifically, for height, the processor 502 is configured to extract several features including the minimum, maximum, average, and exact height from the depth data when s/he is crossing door 706 and overall minimum, maximum, average, and median height during the entrance/exit event. Similar features are extracted regarding the head radius and shoulder size. The processor 502 is configured to match these features to identify individuals.

In a step 416, the processor 502 is configured to determine a count of people who currently occupy the site. Particularly, for each frame, for each person within that frame, the processor 502 is configured to determine Di, which is 1 if he is outside of Door1 and 0 otherwise, where $i \in \{1, 2\}$. The processor 502 is configured to increase the occupancy count if someone's Di is changed from 1 (at the previous frame) to 0 (at the current frame). The processor 502 is configured to note the direction of the person and if his Dj ($j \neq i$) is changed from 1 to 0 later, the processor 502 is configured to not increase the count again. However, if either Di or Dj is changed from 0 to 1 later, the processor 502 is configured to decrease the occupancy count and ignore a similar change (0 to 1) subsequently.

FIG. 5 illustrates a block diagram of an access control system. The system 500 includes an occupancy sensor 516, a processor 502, a computer readable medium 506, a communication interface 504, an input/output interface 508, a graphical user interface (GUI) 512, an access verifier 514, and an access management module 510. Depending on the application, other computer implemented devices for performing other features not defined herein may be incorporated into the system 100. One or more system buses B coupled to one or more computer implemented devices 516, 502, 506, 504, 508, 512, 514, 510 for facilitating communication between various computer implemented devices 516, 502, 506, 504, 508, 512, 514, 510 one or more output devices, one or more peripheral interfaces, and one or more communication devices. The system bus may be any types of bus structure including a memory or a memory controller, a peripheral bus, a local bus, and any type of bus architectures. The sensor 516 is a depth sensor, which is configured to detect and track people that are going in and coming out through a doorway in real-time in the site.

In one embodiment, 516 is used to count people using depth sensor mounted at the ceiling near to a doorway. In another embodiment, an IR-array sensor is mounted at the side of a door to perform occupancy estimation. Although one sensor 516 is illustrated, more than one depth sensor may be disposed within the system 500. Other types of sensor such as optical sensors, imaging sensors, acoustic sensors, motion sensors, global positioning system sensors, thermal sensors, IR array sensors, environmental sensors, and so forth may be coupled to the depth sensor and mounted within the system 500. In some embodiments, other non-depth sensor as a separate device may be electrically coupled to the system 500. The processor 502 may be a general or special purpose microprocessor operating under control of computer executable instructions, such as program modules. Program modules generally include routines, programs, objects, components, data structure and the like that perform particular tasks or implement particular abstract types. The processor 502 may be a microprocessor (µP), a microcontroller (µC), a digital signal processor (DSP), or any combination thereof. The processor 502 may include one or more levels of caching, such as a level cache memory, one or more processor cores, and registers. The example processor cores 502 may (each) include an arithmetic logic unit (ALU), a floating point unit (FPU), a digital signal processing core (DSP Core), or any combination thereof. In one embodiment, some or all of the sub-processors may be implemented as computer software tangibly stored in a memory to perform their respective functions when executed. In alternate embodiment, some or all of the sub-processors may be implemented in an ASIC. As illustrated, the processor 502 is a low power microprocessor configured to process depth data and perform computation for access control.

The computer readable media 506 may be partitioned or otherwise mapped to reflect the boundaries of the various subcomponents. The computer readable media 506 typically includes both volatile and non-volatile media, removable and non-removable media. For example, the computer readable media 506 includes computer storage media and communication media. Computer storage media includes both volatile and nonvolatile, removable and non-removable media implemented in any method or technology, CD-ROM, DVD, optical disk storage, magnetic cassettes, magnetic tape, magnetic disk storage or other magnetic storage device, or any other medium which can be used to store the desired information and which can by accessed by a client machine. For example, computer storage media can include a combination of random access memory (RAM), read only memory (ROM) such as BIOS. Communication media typically includes computer readable instructions, data structures, program modules, or other data in a modulated data signal such a carrier wave or other transport mechanism and include any information delivery media. Communication media may also include wired media such as a wired network or direct-wired communication, and wireless media such as acoustic, RF, infrared (IR) and other wireless media. Communications of the any of the above should also be included with the scope of computer readable media.

The input/output subsystem 508 includes various end user interfaces such as a display, a keyboard, joystick, a mouse, a trackball, a touch pad, a touch screen or tablet input, a foot control, a servo control, a game pad input, an infrared or laser pointer, a camera-based gestured input, and the like capable of controlling different aspects of the machine operation. For example, user can input information by typing, touching a screen, saying a sentence, recording a video, or other similar inputs. The communication interface 504 allows software and data to be transferred between the computer system and other external electronic devices in the form of signals which may be, for example, electronic, electromagnetic, optical, or other signals capable of being received by the communication interface 504. The communication interface 504 may be for example a modem, a network interface, a communication port, a PCM-CIA slot and card, or the like.

An access verifier 514 is incorporated in the system 100. In one embodiment, it verifies the privilege of the swiped badge. The module 514 may be communicatively coupled to one or more computer implemented devices 516, 502, 506, 504, 508, 512, 510 in some embodiments. In another embodiment, the module 514 may be embedded into the processor 502 and into access management module 510.

An access management module 510 is incorporated in the system 100. The module 510 may be communicatively coupled to one or more computer implemented devices 516, 502, 506, 504, 508, 512, 514 in some embodiments. In another embodiment, the module 510 may be embedded into the processor 502. Module 510 is configured to fuse the information from occupancy sensor 516 and access verifier 514 to detect unauthorized access. The way it does so is by checking the number of entrances (N1) reported by occupancy sensor 516 and comparing it with the number of access grants (N2) reported by access verifier 514. N1 must be less than or equal to N2 within a time window. Otherwise, it rings an alarm immediately and logs the badge information from 514 and timestamp into a storage. The alarm could be a part of the access management module 510.

The log of the access management module can be accessed from a 106 machine, e.g., laptop, a desktop, a tablet with proper authorization.

FIG. 6 is an illustration of a hemi-ellipsoid model based on data captured via a depth sensor of an occupancy estimation system. Given a center ($c_x$, $c_y$) and a radius (r) of a head, the system verifies if there is an object such as a human head at this position. A human head is modeled using a hemi-ellipsoid, which is orientation invariant. Although not shown in this image, the depth sensor may further be configured to output depth data such that the occupancy estimation module may be able to identify arms and hands along with the shoulders and head based on the hemi-ellipsoidal model. This level of detection may be used to identify which lane of a multi-lane turnstile (such as illustrated in FIG. 3) an individual is using to cross the entrance threshold. For example, referring back to FIG. 3, an individual is crossing the entrance threshold via the fourth lane of the multi-lane turnstile wherein the access request is provided via the left arm of the individual with the fourth turnstile cabinet 302*d* via the fourth reader 304*d*. Here, the occupancy estimation module may also identify which lanes to provide the access grant. The with the fourth reader 304*d* on the fourth turnstile cabinet 302*d* may be used to grant access to either the third or fourth lanes, and the occupancy estimation module may be used to determine which lane to provide the access grant to. Alternatively, the individual may have used their right arm to initiate the access request to the fifth reader 304*e* of the fifth turnstile cabinet 302*e*.

FIG. 7 is an illustration of tracking a person entering and another person exiting a location based on an image captured via an occupancy estimation system.

It shows that person 702 entering through the doorway and person 704 exiting through the doorway. Processor 502 tracks individuals by performing lightweight greedy bipartite matching. It increments occupancy count when person 702 crosses door line 706 (goes from the left side to the right side of the line segment 706). Processor 502 decrements occupancy count when person 704 crosses door line 706 (goes from the right side to the left side of the line segment 706).

Generally, time period associated with the access grant may be predetermined based on many system attributes including physical location of the access reader with respect to the entrance threshold, a time required to open a barrier such as an automatic door, a revolving door, a partition, or tripod turnstile. Also, the time period be variable based on the detected motion of the individuals based on the hemi-ellipsoidal model. A time period may be increased if the individual is traversing the threshold is moving slowly or slows down. Also, in the case of a train, subway, or other high flow area, the time period may be quick as the people authenticate and move quickly across the threshold.

Figure 8:
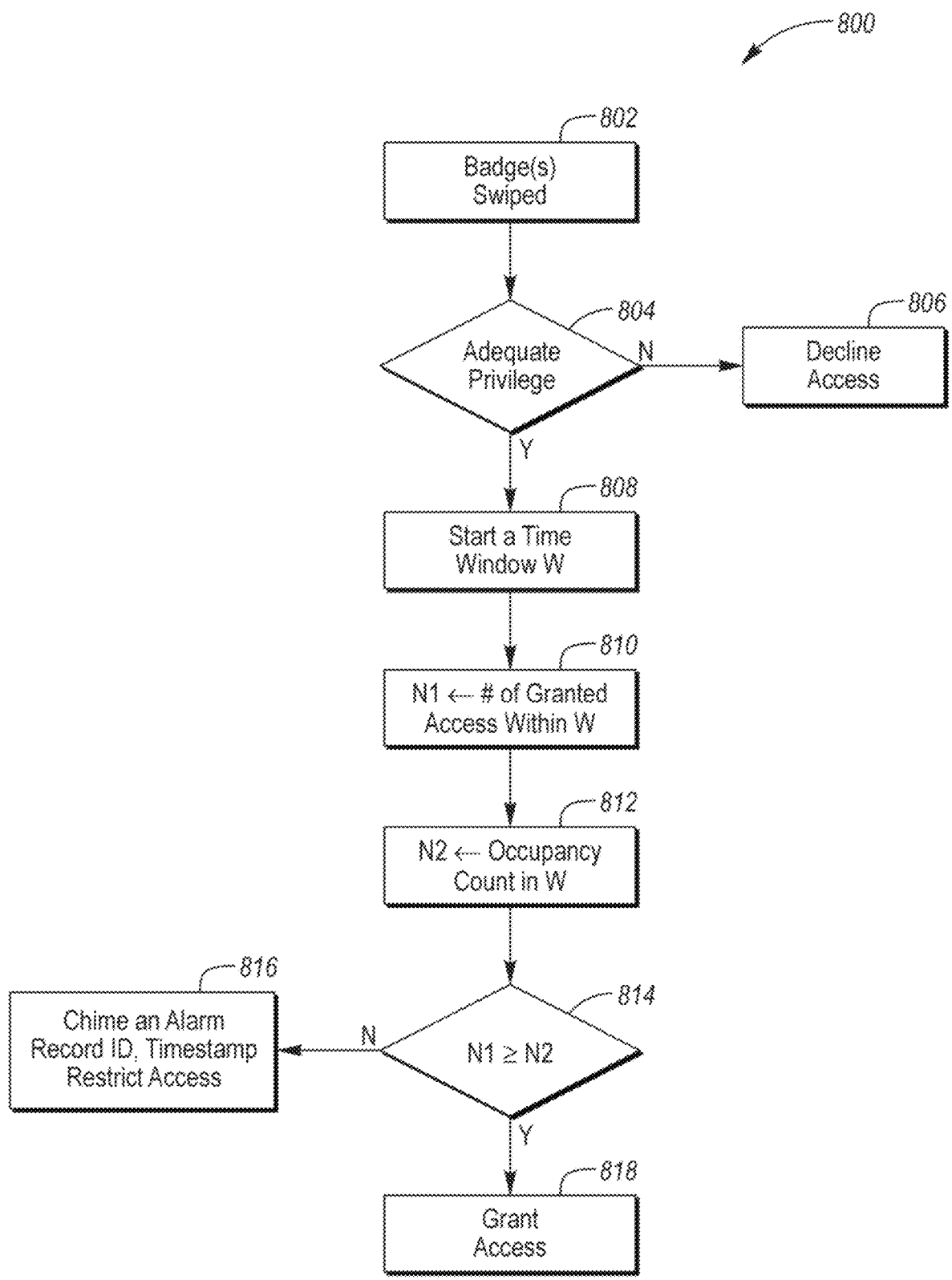
FIG. 8 is an illustration of enforcing access control by leveraging occupancy count.

FIG. 8 is an illustration of a flow diagram 800 for a system to enforce access control by independently verifying occupancy count with respect to an access grant. The flow diagram 800 may be executed on an access control system utilizing an occupancy estimation system and an access verification system.

First in step 802, a controller of the access control system receives an access request from a reader. The reader may be a badge reader, a fingerprint reader, a retinal scanner, a face detection reader, ticket reader, a bar code reader (e.g., a Universal Product Code (UPC), or a Quick Response (QR) code reader), a magnetic reader, a Near Field Communication (NFC) reader, an inductively coupled reader, or other known reader. This step may include receiving multiple access grants from readers located on turnstiles each associated with a specific lane of the turnstile.

Next, in step 804, the controller verifies if the access request has adequate privileges. The verification may include communication with a verification server. If the access request does not have adequate privileges, the controller branches to step 806.

In step 806 the controller outputs access declined. The access declined may be a null message, or the controller may record identification data associated with the access request. For example, if an individual attempts to enter a location they are not allowed to (e.g., a research lab, a safe, an office, a vault, etc.) the controller may record the identification data, time of access request, and location of the access request. In step 804, if the access request is made in which there is privilege, then the controller branches to step 808.

At step 808, the controller starts a timer for a time window W and proceeds to step 810. At step 810, the controller receives a number (N1) from the access control system. The number is an amount of individuals allowed admittance based on the privilege of the access grant. For example, a number may be 1 for an access grant of a single individual which may be the most common instance for access at a place of business or a single ticket to a venue. Another example would be a transportation ticket in which each credit can be associated with one individual taking multiple trips, or for more than one individual taking a single trip or combination thereof. Consider a 10 pass ticket that can be used by one person to use 10 single access grants, or 2 people using the ticket for 5 pairs of access grants, or 10 people using the ticket wherein each has a single access grant. The controller will then proceed to step 812.

At step 812, the controller receives a count (N2) from an occupancy detection module. The count (N2) is associated with detected individuals crossing the threshold or barrier within time window W of step 808. Based on a detection map from a sensor, such as Occupancy Sensor 516, the controller, such as Access Management Module 510, estimates an occupancy count (N2) within W in step 812.

Then in step 814, the controller compares the number N1 with the count N2. If N1 is greater than or equal to N2, the controller outputs a signal to grant access in step 818. If N2 is greater than N1, the controller, such as Access Management Module 510, outputs an error signal and proceeds to step 816. In step 816, the controller may trigger a chime, an alarm, recording relevant badge ID(s) or other identifiable information and timestamp, and may restrict access.

One illustrative example of FIG. 8 includes at step 802, a badge or multiple badges are swiped. Then in step 804, Access Verifier 514 verifies whether the badges have adequate privileges. If not, the access is declined in step 806. If enough privilege is present, then Access Management Module 510 starts a timer for a time window W in step 808. Then, 510 module counts the number of granted access within time window W in step 810. It is assumed as N1. Then, with the help of Occupancy Sensor 516, Access Management Module 510 estimates occupancy count within W in step 812. It is assumed as N2. Then Module 510 checks if N1 is greater than or equal to N2 at step 814. If so, it grants access in step 818. In case it is not, then Access Management Module 510 chimes an alarm, records relevant badge ID(s) or other identifiable information and timestamp, and may restrict access at step 816.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. An access control system comprising:
   an entrance threshold;
   a privilege access management module configured to, responsive to an authorization input from a reader, output an access grant to traverse the threshold and generate an approved number of individuals allowed admittance across the threshold during a predetermined period of time;
   a depth sensor located above the threshold and configured to generate and output 3-dimensional depth data, wherein the depth sensor is a time of flight sensor or a stereo camera sensor, and generation of the depth data is triggered by an Red Green Blue (RGB) camera, an ultrasonic sensor, a motion detector, or an infrared array sensor;
   an occupancy estimation module, in communication with the privilege access management module, configured to output a count of individuals crossing the threshold during the predetermined period of time, that is based on a hemi-ellipsoid model of the depth data, wherein the hemi-ellipsoid model is indicative of a human head traveling across the entrance threshold, and the occupancy estimation module is further configured to detect a rate of motion and trajectory of the hemi-ellipsoid model; and responsive to a difference between the number and count, inhibit the access grant.

2. The access control system of claim 1, wherein the predetermined period of time is set based on the rate of motion and is associated with the access grant.

3. The access control system of claim 2, wherein the entrance threshold is a multi-lane turnstile such that each lane has a single reader associated with each lane and one occupancy estimation module for each two readers and two lanes of the multi-lane turnstile.

4. The access control system of claim 3, wherein the hemi-ellipsoid model is indicative of a human head traveling across the entrance threshold, and the occupancy estimation module is further configured to detect objects indicative of shoulders and arms, and based on the trajectory and position of the shoulders and arms, associate a lane of the multi-lane turnstile with the authorization input and the count.

5. The access control system of claim 1, wherein the system has one occupancy estimation module for greater than two readers.

6. The access control system of claim 1, wherein the reader is a badge reader, barcode reader, a fingerprint reader, a ticket reader, or a card reader.

7. The access control system of claim 1, wherein the entrance threshold is an automatic door and inhibiting the access grant includes closing the door.

8. An access management method comprising:
receiving, from a privilege access management module, an access grant through an entrance;
generating an approved number of individuals allowed to pass through the entrance based on the access grant during a predetermined period of time;
parsing data from a depth profiler located above the entrance, the data being indicative of objects below the depth profiler;
generating a count of individuals identified from the data via a hemi-ellipsoidal model crossing the entrance during the predetermined period of time; and
responsive to a difference between the number and count, inhibiting admittance through the entrance; and
adjusting the predetermined period of time based on a rate of motion and trajectory of the hemi-ellipsoid model.

9. The method of claim 8, wherein the entrance is a multi-lane turnstile, the privilege access management module includes a multiple readers such that each reader is associated with each lane.

10. The method of claim 9, wherein each depth profiler is located above each two readers and two lanes of the multi-lane turnstile, and the hemi-ellipsoid model is indicative of a human head traveling across the entrance, and the depth profiler is further configured to detect a trajectory of the hemi-ellipsoid model and to detect objects indicative of shoulders and arms.

11. The method of claim 10, wherein the depth profiler is further configured to, based on the trajectory and position of the shoulders and arms, associate a lane of the multi-lane turnstile with the access grant and the count.

12. The method of claim 8, wherein the entrance is a door of a vehicle.

13. A non-transitory computer-readable medium tangibly embodying computer readable instructions for a software program, the software program being executable by a processor of a computing device to provide operations comprising:
receiving, from a privilege access management module, an access grant through an entrance;
generating an approved number of individuals allowed to pass through the entrance based on the access grant;
parsing data from a depth profiler located above the entrance, the data being indicative of objects below the depth profiler;
generating a count of based on individuals identified from the data via a hemi-ellipsoidal model;
responsive to a difference between the number and count, inhibiting admittance through the entrance; and
adjusting the predetermined period of time based on a rate of motion and trajectory of the hemi-ellipsoid model.

14. The medium of claim 13, wherein the generation of the approved number of individuals allowed to pass through the entrance based on the access grant is associated with a predetermined period of time.

15. The medium of claim 14, wherein the generation of the count is during the predetermined period of time.

16. The medium of claim 15, wherein the entrance is a door of a vehicle.

17. The medium of claim 16, wherein the entrance is a multi-lane turnstile.

* * * * *